No. 669,169. Patented Mar. 5, 1901.
G. W. HODGES.
FRUIT PICKER.
(Application filed Dec. 7, 1900.)

(No Model.)

Witnesses
C. H. Walker
H. S. Shepard

G. W. Hodges, Inventor.
by C. A. Snow & Co.
Attorneys

THE NORRIS PETERS CO., PHOTO-LITHO., WASHINGTON, D. C.

UNITED STATES PATENT OFFICE.

GEORGE W. HODGES, OF ANUTT, MISSOURI.

FRUIT-PICKER.

SPECIFICATION forming part of Letters Patent No. 669,169, dated March 5, 1901.

Application filed December 7, 1900. Serial No. 39,069. (No model.)

*To all whom it may concern:*

Be it known that I, GEORGE W. HODGES, a citizen of the United States, residing at Anutt, in the county of Dent and State of Missouri, have invented a new and useful Fruit-Picker, of which the following is a specification.

This invention relates to fruit-pickers, and has for one object to facilitate the manipulation of such a device so as to pick fruit from all sides of the branches of trees and to effectively retain the picked fruit upon the device, so as to prevent the same from dropping to the ground, and thereby being bruised and damaged. It is furthermore designed to have the head of the device adjustably mounted upon the upper end of the handle thereof and to provide for conveniently manipulating the same from the ground, so as to swing the head into different positions and accommodate the same to the fruit to be picked.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
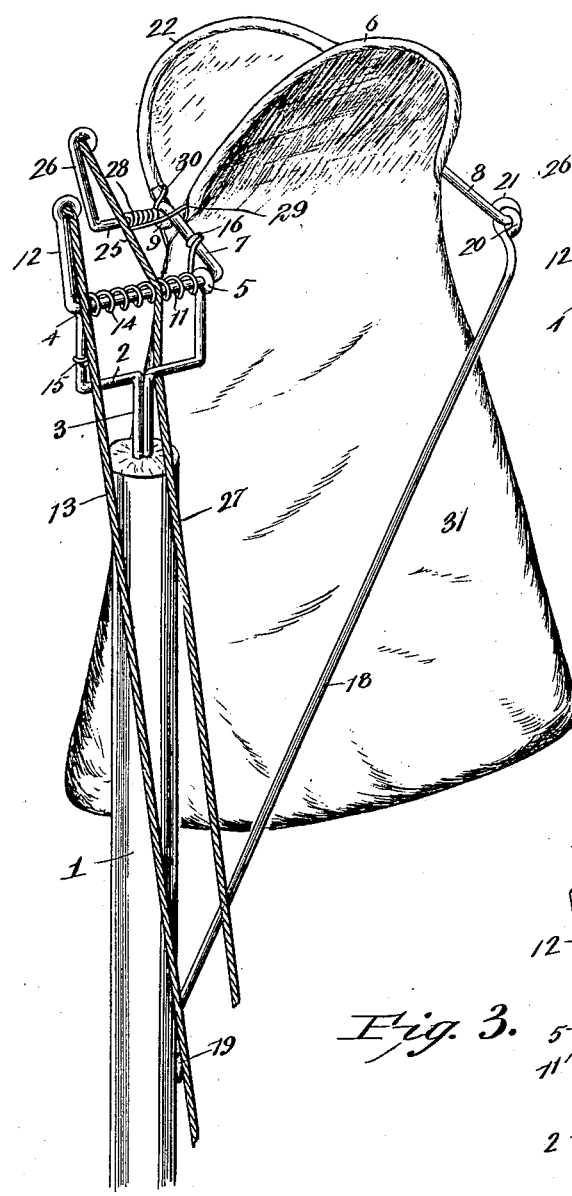
Figure 2:
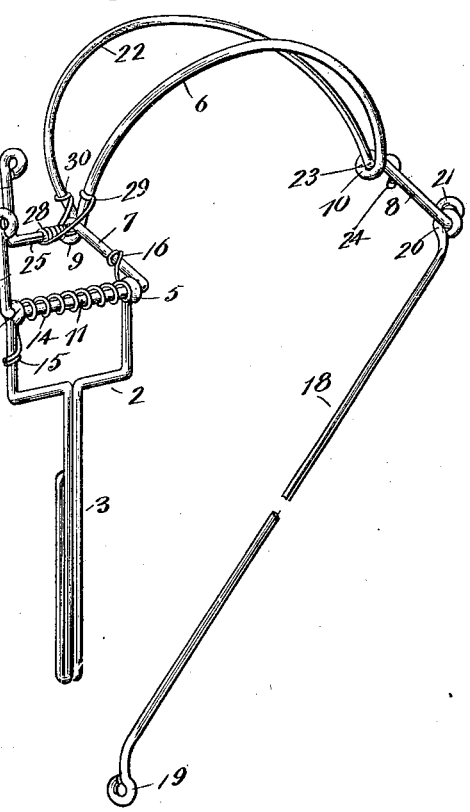
Figure 3:
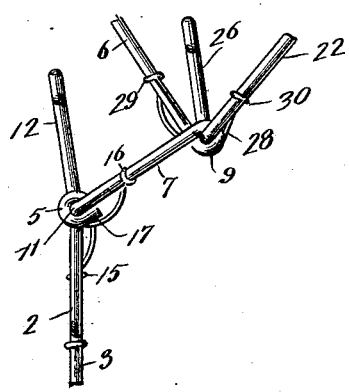

In the drawings, Figure 1 is a perspective view of a fruit-picker constructed in accordance with the present invention. Fig. 2 is a detail perspective view of the frame of the adjustable head, the fruit-receiving bag being removed. Fig. 3 is an inner edge view of the head with the jaws thereof broken away.

Like characters of reference designate corresponding parts in all of the figures of the drawings.

Referring to the drawings, 1 designates the handle, preferably formed of wood and of suitable length, so as to facilitate the application of the jaws of the device to the fruit upon a tree. At the upper end of the handle there is provided the forked head 2, which has a shank 3, that is set into the adjacent end of the handle or otherwise connected thereto in a rigid manner. This forked head is preferably formed from a single length of stiff wire, which is bent intermediate of its ends to form the shank, and has its opposite end portions spread apart, so as to form a substantially U-shaped fork, the outer terminals of which are twisted into the outer and inner bearing-eyes 4 and 5.

The relatively-fixed jaw 6 is of upwardly-bowed arcuate shape and is formed from a single length of wire, having its opposite end portions bent laterally forward into the respective inner and outer transverse arms 7 and 8. In bending these arms the respective bearing-eyes 9 and 10 are formed at the intersections of the arms and the jaw and located entirely upon the rear side thereof. The outer extremity of the inner arm 7 is bent laterally outward at substantially right angles thereto, so as to form the rock bar or journal 11, which projects loosely through the bearing-eyes of the forked head, and has its outer end provided with an upstanding crank-arm 12, to the outer end of which is connected an operating-cord or the like 13, which extends to the opposite or lower end of the handle for convenience in swinging the relatively-fixed jaw upon its pivotal or hinged connection with the handle, for a purpose as will be hereinafter set forth. Normally the relatively-fixed jaw inclines slightly forward and is yieldingly maintained in this position by means of a coiled spring 14, which encircles the rock-bar 11, and has its opposite ends 15 and 16 connected to the outer member of the forked head and the adjacent arm 7 of the jaw, respectively. As best shown in Fig. 3 of the drawings, it will be seen that a stop 17 is employed to limit the rearward swing of the jaw 6, the latter being normally in engagement with the stop. This stop is formed by the extremity of the wire which forms the bearing-eye 5, said extremity being offset laterally, so as to lie in the path of the rearward swing of the arm 7. To brace and pivotally support the outer end of the relatively-fixed jaw, there is provided an inclined brace-rod 18, which has its lower end formed into an eye 19 for the reception of a fastening, whereby the rod is connected to the intermediate portion of the handle, and its upper end is also twisted into a bearing-eye 20, with which is loosely engaged the terminal bearing-eye 21 of the outer arm 8, thereby forming a pivotal connection between the jaw and the brace. The movable jaw 22 is also formed of wire bowed upwardly and inclined rearwardly away from the fixed jaw. The outer end of this jaw is bent outwardly to form a journal 23, which is passed outwardly through the bearing-eye 10 of the fixed jaw, and has its outer end then bent laterally inward and downward to form a stop projection 24, which normally lies against the rear and under side of the arm 8 of the fixed jaw, so as to limit the opening or rearward swing of the movable jaw. The opposite end of the movable jaw is bent laterally outward to form a journal 25, which is passed outwardly through the adjacent bearing-eye 9 of the fixed jaw, this journal being projected a suitable distance and then bent upwardly into a crank-arm 26, to which is connected an operating-cord or the like 27, which extends downwardly to the lower end of the handle, whereby the movable jaw may be conveniently manipulated from the ground. The movable jaw is normally and yieldingly held open or away from the fixed jaw by means of a coiled spring 28, encircling the extended portion of the journal of the movable jaw and having one end 29 connected to the adjacent portion of the fixed jaw and the opposite end 30 connected to the movable jaw.

A fruit-receiving bag 31 has the opposite portions of its upper open end secured to the respective jaws in any suitable manner and hangs downwardly against the rear sides of the handle and the brace 18, whereby the bag is normally steadied.

In the operation of the device the handle is manipulated so as to place the jaws at opposite sides of a fruit hanging from a limb of a tree, and then the cord 27 is pulled, so as to swing the movable jaw 22 forwardly, and thereby grip the stem tightly between the two jaws, after which the handle is given a quick jerk downwardly, thereby breaking the stem, and when the cord is released the movable jaw will spring open, thus releasing the fruit, which will fall into the bag. In some instances it is desirable to change the general upward arrangement of the jaws, and this is accomplished by pulling downwardly upon the cord 13, thereby operating the rock-bar 11 and swinging or adjustably tilting both jaws forwardly, so as to facilitate the engagement of the jaws with an otherwise inaccessible fruit.

What is claimed is—

1. A fruit-picker, comprising a handle, a relatively-fixed jaw adjustably pivoted to the handle, adjusting means connected to the jaw and extending toward the opposite end of the handle, a movable jaw mounted upon the fixed jaw, means for operating the movable jaw, and a bag suspended from both jaws.

2. A fruit-picker, comprising a handle, a relatively-fixed jaw, having a laterally-projected rock-bar mounted upon the handle, and provided with a crank-arm, an adjusting device connected to the crank-arm, a movable jaw mounted upon the fixed jaw, means for operating the movable jaw, and a bag suspended from both jaws.

3. A fruit-picker, comprising a handle, a relatively-fixed adjustable jaw mounted upon one end of the handle, adjusting means connected to the jaw and extending to a point within reach from the opposite end of the handle, a movable jaw mounted upon the relatively-fixed jaw, and operating means for the movable jaw.

4. A fruit-picker, having a handle, a forked head carried by one end thereof, the members of the head having corresponding bearing-eyes, a relatively-fixed jaw, having a rock-bar journaled in the bearing-eyes, and carrying an outer terminal crank-arm, an adjusting-cord or the like connected to the crank-arm, a movable jaw mounted upon the fixed jaw, operating means connected to the movable jaw, and a bag suspended from both jaws.

5. A fruit-picker, comprising a handle, a forked head carried thereby, a relatively-fixed adjustable jaw, having a rock-bar journaled across the members of the forked head, an adjusting device connected to the jaw, a coiled spring encircling the rock-bar and having its opposite ends connected to the head and the jaw, respectively, a movable jaw mounted upon the fixed jaw, means for operating the movable jaw, and a bag suspended from both jaws.

6. A fruit-picker, comprising a handle, a longitudinal outwardly-inclined brace carried thereby, a relatively-fixed spring-pressed adjustable jaw having its opposite ends journaled upon the handle and the brace, respectively, means for adjustably tilting the jaw, a movable spring-pressed jaw mounted upon the fixed jaw and coöperating therewith, means for operating the movable jaw, and a bag suspended from both jaws.

7. A fruit-picker, comprising a handle, a longitudinal outwardly-inclined brace carried thereby, a relatively-fixed adjustable jaw, having opposite terminal transverse arms pivotally connected to the brace and the handle, respectively, means for yieldably holding the jaw in its normal position, an adjusting device connected to the jaw, a movable jaw coöperating with the fixed jaw, and having its opposite ends pivotally mounted upon said fixed jaw at the respective intersections of the latter and the arms thereof, means for yieldingly holding the movable jaw inclined away from the fixed jaw, an operating device for the movable jaw, and a bag suspended from both jaws.

8. A fruit-picker, comprising a handle, a forked head at one end thereof, and having corresponding bearing-eyes a longitudinal and outwardly-inclined brace having an outer terminal bearing-eye, a relatively-fixed adjustable jaw, having its opposite end portions bent into transverse arms, with bearing-eyes formed at the intersections of the arms and the jaw, the outer end of the outer arm being pivotally connected to the brace, and the inner arm having a lateral rock-bar mounted in the eyes of the head, and an outer terminal crank-arm carried by the rock-bar, a coiled spring embracing the rock-bar and bearing in opposite directions upon the jaw and the head, a stop upon the head and in the path of the jaw, an adjusting-cord connected to the crank-arm, a movable jaw having its opposite ends pivoted within the respective eyes of the fixed jaw, the outer end having a stop normally in engagement with the fixed jaw, the inner end having an outwardly-extended pivotal portion, provided with a crank-arm, an operating-cord connected to the crank-arm, a coiled spring encircling the projected pivotal portion and bearing in opposite directions against the fixed jaw and the movable jaw, and a bag suspended from both jaws.

In testimony that I claim the foregoing as my own I have hereto affixed my signature in the presence of two witnesses.

GEORGE W. HODGES.

Witnesses:
S. A. HODGES,
J. C. CAMBEL.